Nov. 23, 1954     T. J. McCUISTION     2,695,037
PISTON
Filed July 24, 1952
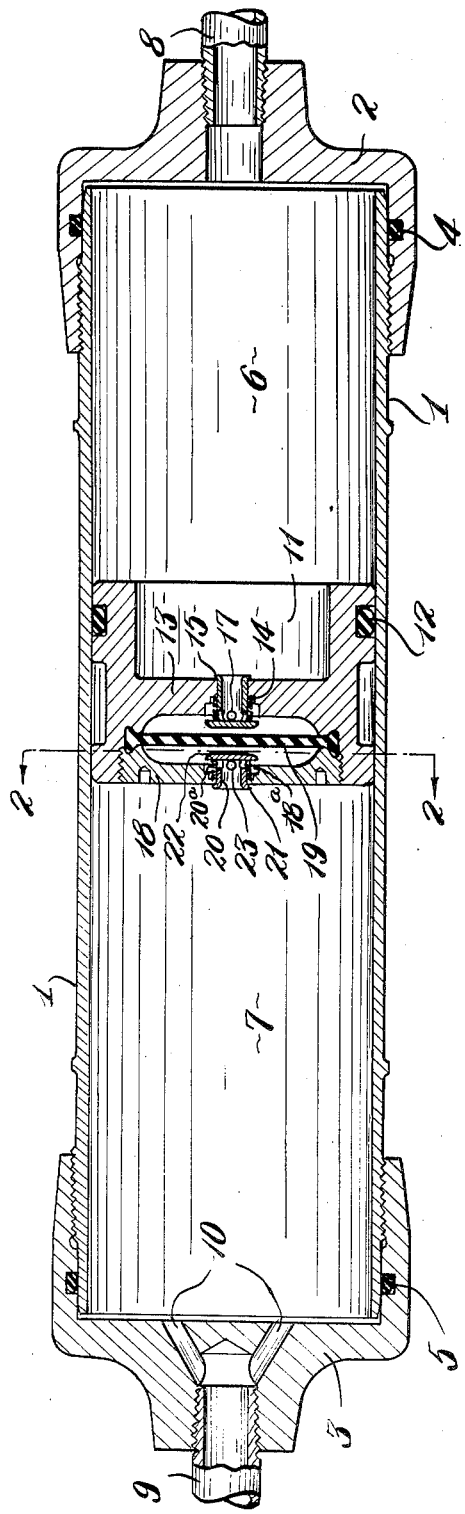
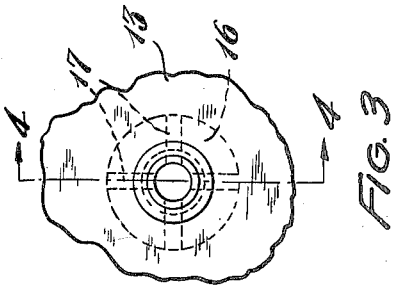
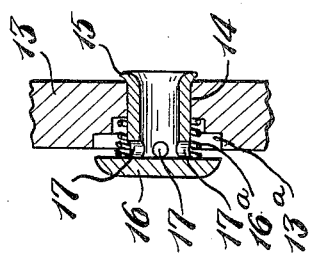
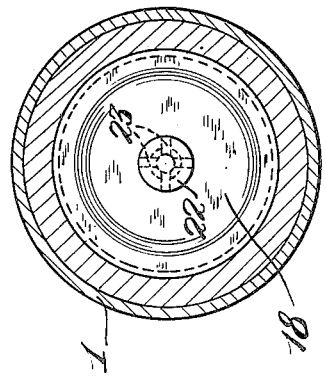
INVENTOR.
TOMMY J. McCUISTION
BY
Milburn Milburn
ATTORNEYS

United States Patent Office 2,695,037
Patented Nov. 23, 1954

2,695,037

PISTON

Tommy J. McCuistion, Euclid, Ohio

Application July 24, 1952, Serial No. 300,566

6 Claims. (Cl. 137—792)

This invention relates to the art of accumulators and is an improvement upon those shown in my co-pending applications Serial No. 199,104, filed December 4, 1950 and Serial No. 225,520, filed May 10, 1951, to which reference may be had for a fuller understanding of the type of device herein referred to.

As explained in my co-pending applications, supra, and as is well known to those who are familiar with the art to which this invention relates, a piston type of accumulator generally is objectionable since it may prove to be a real hazard under certain conditions and also because of the non-absorption and the transmission of vibrations or surging due to the irregularity of operation of the pump connected thereto. As to the hazardous condition, suffice to say that in the use of a piston type of accumulator in connection with hydraulic equipment, as for instance upon an airplane, the piercing of the wall of the storage chamber for the liquid causes sufficient internal displacement and sufficient instantaneous increase in internal pressure to produce an explosion-like bursting of the walls of the accumulator and a consequent scattering of the particles of metal thereof, which may of course prove very serious.

As will be understood from the above-noted applications as well as from the present disclosure, the structure of accumulator to which my present invention relates, includes a cylinder having a fixed head with a tubular connection therethrough for the supply of oil or other liquid into and its withdrawal from the compartment provided therefor in the accumulator; and, in the present form of device, its other end has a fixed head with a suitable connection for the air to its compartment at the opposite side of the piston.

Also, as will be observed from my co-pending applications, supra, my general idea has been to provide a flexible diaphragm between the two chambers or compartments of the cylinder for the purpose of absorbing undue expansive force therein and thereby preclude a bursting of the cylinder and the consequent danger therefrom.

With openings in the heads at the two ends of the cylinder for the oil and air, respectively, and with a particular form or arrangement of passages through the head at the end corresponding to the oil chamber, it is important to provide means for preventing abnormal or undue dilation of the flexible diaphragm so as to maintain the same in proper condition for most efficient operation.

It is therefore the object of my present invention to devise an accumulator of the type above referred to, with means for preventing abnormal dilation of the flexible diaphragm in either direction longitudinally of the cylinder.

Another object is to devise an accumulator of the type above referred to, in which the piston is provided with a flexible diaphragm together with means carried by the piston for preventing abnormal dilation of the diaphragm in either direction longitudinally of the cylinder.

More specifically, another object is to devise such an accumulator with a flexible diaphragm upon the piston and with one-way valve means, carried by the piston upon both sides of the diaphragm, that will permit exertion of pressure from either side of the piston upon the diaphragm and will prevent abnormal dilation of the diaphragm in either direction longitudinally of the cylinder so as to prevent damage to the diaphragm.

Other objects will appear from the following description and claims when considered together with the accompanying drawing.

Fig. 1 is a longitudinal sectional view of my present accumulator;
Fig. 2 is a view taken on line 2—2 of Fig. 1;
Fig. 3 is an end view of the valve means in the wall 13;
Fig. 4 is a view taken on line 4—4 of Fig. 3.

Referring now to the accompanying drawing in detail, the metal cylinder 1 has the opposite metal heads 2 and 3 applied thereto by means of screw threads and there are provided the sealing gaskets 4 and 5 therefor. The cylinder chamber is divided into two compartments 6 and 7 by the piston to be hereinafter described, these two compartments being intended for air and oil or other liquid, respectively. The head 2 has the tubular connection 8 for the air while the head 3 has the tubular connection 9 for the oil, for instance. The head 3 has angularly disposed passages 10 for the purpose of reducing the internal force that might be exerted from chamber 7 against the screw-threaded connection of the tubular member 9 for the oil; and these outwardly converging ducts 10 may be spaced at equal intervals about the longitudinal axis of the cylinder and may constitute the only means of communication through the head 3. By thus changing the direction in which the force of the increased internal pressure is exerted outwardly at this point, there is reduced the danger of its damaging effect upon the screw-threaded connection of the tubular element 9.

Now with regard to the piston structure in my present form of device, the piston 11 of suitable metal has the sealing gasket 12 and a main transverse web or wall 13 in the centre of which is reciprocatably mounted the open-end tubular valve member 14 which is held in assembly by turning over its one end at 15 and which has its other end provided with a valve head 16 with the radially arranged passages 17 through the tubular portion 14 immediately therebeneath. This valve member will normally be held in open position by the coil spring 16a and, when closed, the valve head 16 will seat within the recess 13a provided therefor in the piston wall 13.

The piston 11 has a screw-threaded disk member 18 applied thereto for the purpose of holding in position the flexible diaphragm 19 of rubber or other suitable flexible material. As indicated in the drawing, the annular edge portion of this diaphragm is formed of substantially T-shape in cross section which is adapted to be engaged within the correspondingly formed groove provided by the adjacent portions of the piston 13 and the disk 18. Thus, when the disk member 18 is in place, the diaphragm 19 will be most effectively held in place so that there is no danger of accidental dislodgement of the same. The center of the disk 18 has an aperture within which is reciprocatably mounted a valve member 20 like that shown in Fig. 4 of the present drawing. The member 20 is of open-end tubular form with its one end secured in assembly by turning over the same, as indicated at 21, and with its other end in the form of a valve head 22 which extends in parallel relation to the disk 18 and which has the radially arranged ducts or ports 23 through the tubular portion 20 immediately beneath the valve head 22. This valve member will be normally held in open position by the coil spring 20a and, when closed, its valve head 22 will seat within the recess 18a provided therefor in the disk member 18. The disk 18 may be made of the desired relative thickness with relation to that of the wall 13 and the dimensions of the valve member 20—22 may be in accordance therewith.

With this arrangement, any compressive force may be exerted from either of the compartments 6 and 7 through the passage afforded by either of the valve members 14—16 and 20—22 so as to be impressed upon the diaphragm 19 which is enclosed within the space between the wall 13 and the disk 18 and in suitably spaced relation thereto. It is to be understood that the extent of this space may be varied.

Thus it will be seen that the diaphragm 19 is at all times exposed to the pressure within the chambers 6 and 7 and that any excessive or inordinate pressure that might be caused by the entrance of a foreign body, as for instance a bullet in the chamber 7, will be absorbed by the flexible diaphragm 19; but, at the same time, the valve members 16 and 22 will prevent the diaphragm from being forced into or through an unshielded opening, as might otherwise be the case, either in the piston or in the end head of the cylinder.

If the valve member 20—22 be omitted, there would be an opening in the disk 18 of less diameter than that between the inner edges of the passages 10 so as to prevent the diaphragm 19 from being forced into the passages 10.

In either case, any excessive pressure within either of the compartments 6 and 7 will be exerted through the opening in the corresponding wall 13 or 18, respectively, and will cause dilation of the flexible diaphragm 19; and the dilation of the diaphragm will cause the valve member upon the opposite side thereof to be closed and, in this way, the diaphragm will be prevented from entering the opening in the other or opposite wall of the piston. That is, when one of the one-way valve members is open for transmission of the pressure therethrough to the diaphragm, the other valve member will be automatically closed and held closed so as to prevent the diaphragm from entering the same. In this way, there is ensured access of the pressure from either compartment to the diaphragm but without the danger of the diaphragm being pinched within the opening in either case. Thus the operation is rendered more dependable and the life of the diaphragm is prolonged.

It is believed that other practical advantages of my present invention will suggest themselves to those who are familiar with the art to which this invention relates.

What I claim is:

1. In a device of the class described, a piston adapted to be bodily reciprocatable longitudinally within a cylinder, said piston having substantially spaced transversely extending wall portions and a flexible diaphragm extending transversely in the space between said wall portions, and each of said wall portions having an opening therethrough so as to permit exertion of pressure therethrough to said diaphragm and having a closure for each of said openings, each of said closures being located upon the side of the wall portion in each instance adjacent said diaphragm and being adapted to permit exertion of pressure through the opening and towards the diaphragm and to be closed by exertion of pressure from said diaphragm so as to prevent entrance of said diaphragm into either of said openings.

2. In a device of the class described, a piston adapted to be bodily movable longitudinally within a cylinder, said piston having substantially spaced transversely extending wall portions and a flexible diaphragm extending transversely in the space between said wall portions, and each of said wall portions having an opening therethrough so as to permit exertion of pressure therethrough to said diaphragm, and an open-end tubular valve member reciprocatably mounted in each of said openings and having a cowl-like closure portion at the end thereof adjacent said diaphragm so as to prevent entrance of said diaphragm into either of said openings.

3. In a device of the class described, a piston adapted to be bodily reciprocatable longitudinally within a cylinder, said piston having a transversely disposed wall and a removable disk arranged in parallel substantially spaced relation to said wall, and a flexible diaphragm secured by the edge portion of said disk in spaced relation between said wall and said disk, said wall and disk each having an opening therethrough so as to permit exertion of pressure therethrough to said diaphragm, and an open-end tubular valve member reciprocatably mounted in each of said openings and having a cowl-like closure portion at the end thereof adjacent said diaphragm so as to prevent entrance of said diaphragm into either of said openings.

4. The same structure as recited in claim 2 hereof and with the addition of spring means for normally holding said valve members in open position.

5. The same structure as recited in claim 2 hereof and in which each of said wall portions has an annular recess facing said diaphragm for receiving said closure portion, and spring means within said recess and engaging said cowl-like closure portion for normally forcing said valve member to open position.

6. In a device of the class described, a piston adapted to be bodily reciprocatable longitudinally within a cylinder, said piston having substantially spaced transversely extending wall portions and a flexible diaphragm extending transversely in the space between said wall portions, and each of said wall portions having an opening therethrough so as to permit exertion of pressure therethrough to said diaphragm, said wall portions having means to prevent abnormal dilation of said diaphragm in response to pressure longitudinally within the cylinder and including a closure for at least one of said openings located upon the side of the wall portion adjacent said diaphragm and being adapted to permit exertion of pressure through the opening and towards said diaphragm and to be closed by exertion of pressure from said diaphragm.

References Cited in the file of this patent

UNITED STATES PATENTS

| Number | Name | Date |
|---|---|---|
| 2,345,124 | Huber | Mar. 28, 1944 |
| 2,385,016 | Mercier | Sept. 18, 1945 |
| 2,417,256 | Kremiller | Mar. 11, 1947 |
| 2,592,613 | Snyder | Apr. 15, 1952 |